(12) United States Patent
Ouchi et al.

(10) Patent No.: US 7,632,599 B2
(45) Date of Patent: Dec. 15, 2009

(54) SEPARATOR FOR FUEL CELL AND FUEL CELL USING THE SAME

(75) Inventors: Kazuo Ouchi, Ibaraki (JP); Hitoshi Ishizaka, Ibaraki (JP)

(73) Assignee: Nitto Denko Corporation, Ibaraki-shi (JP)

(*) Notice: Subject to any disclaimer, the term of this patent is extended or adjusted under 35 U.S.C. 154(b) by 859 days.

(21) Appl. No.: 10/891,565

(22) Filed: Jul. 15, 2004

(65) Prior Publication Data

US 2005/0026028 A1 Feb. 3, 2005

(30) Foreign Application Priority Data

Jul. 15, 2003 (JP) ............... 2003-275019

(51) Int. Cl.
  *H01M 8/02* (2006.01)
  *H01M 8/10* (2006.01)
  *H01M 2/00* (2006.01)
  *H01M 8/24* (2006.01)

(52) U.S. Cl. .............. 429/39; 429/30; 429/34; 429/38

(58) Field of Classification Search .......... 429/29, 429/30, 34, 38, 39; 427/115; 204/295, 296
See application file for complete search history.

(56) References Cited

U.S. PATENT DOCUMENTS 4,988,583 A * 1/1991 Watkins et al. ............ 429/30

2004/0048132 A1 3/2004 Takai et al.
2005/0123817 A1* 6/2005 Hahn et al. ............... 429/32
2005/0202297 A1* 9/2005 Schmitz et al. ........... 429/32

FOREIGN PATENT DOCUMENTS

JP 63236268 * 10/1988

(Continued)

OTHER PUBLICATIONS

Cleghorn, S.J.C.; Derouin, C.R.; Wilson, M.S.; Gottesfeld, S.; A printed circuit board approach to measuring current distribution in a fuel cell, Journal of Applied Electrochemistry, 1998,vol. 28, pp. 663-672.*

(Continued)

*Primary Examiner*—Dah-Wei D Yuan
*Assistant Examiner*—Katherine Turner
(74) *Attorney, Agent, or Firm*—Leydig, Voit & Mayer, Ltd.

(57) ABSTRACT

The present invention provides, as a separator for fuel cell which is lightweight, can be easily made thin, and which has superior corrosion resistance and shape stability, a fuel cell 100 containing a separator for fuel cell 10, wherein a conductor pattern 2 is formed on one principal plane 1A of an insulation layer 1 to form a groove for a gas flow path 3 sectioned by the conductor pattern 2 on this principal plane, a conductor terminal 4 is formed on the other principal plane 1B of the insulation layer 1, and this conductor terminal 4 and the conductor pattern 2 are electrically connected by a via hole 5 penetrating the insulation layer 1, and a membrane electrode assembly (complex having an electrolyte membrane and an electrode (fuel electrode, oxygen electrode) laminated thereon) 14 having the separator for fuel cell disposed on both surfaces.

14 Claims, 13 Drawing Sheets

FOREIGN PATENT DOCUMENTS

| | | | |
|---|---|---|---|
| JP | 6-349511 A | | 12/1994 |
| JP | 10-125337 A | | 5/1998 |
| JP | 2000-36309 A | | 2/2000 |
| JP | 2001-076748 A | | 3/2001 |
| JP | 2002-358982 A | | 12/2002 |
| JP | 2003-272662 A | | 9/2003 |
| JP | 2004-022437 A | | 1/2004 |
| JP | 2005-527944 A | | 9/2005 |
| WO | WO 00/02270 | * | 1/2000 |
| WO | WO 03/028135 A1 | | 4/2003 |
| WO | WO 03/038935 | * | 5/2003 |
| WO | WO03085760 | * | 10/2003 |

OTHER PUBLICATIONS

Webster's New World™ Computer Dictionary, 2003, [online], [retrieved on Mar. 5, 2008], Retrieved from Credo Reference (Xreferplus) using Internet <URL: http://www.credoreference.com/entry/3485627>.*

Official translation of JP63236268A, published Oct. 3, 1988, translated by The McElroy Translation Company Sep. 2009.*

* cited by examiner

SEPARATOR FOR FUEL CELL AND FUEL CELL USING THE SAME

FIELD OF THE INVENTION

The present invention relates to a separator for a fuel cell, which is easy to be made thin and is lightweight, a fuel cell using the separator, a wiring circuit board with the separator for fuel cell and a fuel cell built-in wiring circuit board.

BACKGROUND OF THE INVENTION

As an energy source that does not cause environmental pollution, a fuel cell is attracting attention and researches thereof are actively done in recent years. A fuel cell directly generates electricity by electrochemically reacting hydrogen and oxygen. A fuel cell is basically composed of, as a unit, a power generation cell wherein a membrane electrode assembly is held by being sandwiched between a separator having a groove to be a flow path of a fuel gas (hydrogen gas) and a separator comprising groove to be a flow path of oxygen (air) gas. Here, the membrane electrode assembly consists of an electrolyte membrane, a fuel electrode arranged on one surface of the electrolyte membrane, and an oxygen electrode arranged on the other surface of the electrolyte membrane. A separator comprising a groove to be a flow path of a fuel gas (hydrogen gas) takes the role of flowing the fuel gas (hydrogen gas), such that the fuel gas (hydrogen gas), which is fed into a power generation cell from the outside, comes into contact with the surface of the fuel electrode, passes thereon and is then exhausted to the outside of the power generation cell. A separator comprising a groove to be a flow path of an oxygen (air) gas takes the role of flowing the oxygen (air) gas, such that the oxygen (air) gas, which is fed into a power generation cell from the outside, comes into contact with the surface of the fuel electrode, passes thereon and is then exhausted to the outside of the power generation cell. Basically, a fuel cell consists of one power generation cell. However, when high output power generation is performed, a plurality of power generation cells are stacked one upon another to constitute one fuel cell. A fuel cell composed of such plural power generation cells stacked one upon another is generally referred to as a fuel cell stack.

As mentioned above, a separator in a fuel cell sections gas flow paths of a fuel gas and an oxygen gas, and therefore, is required to have gas impermeability and corrosion resistance hard to deteriorate even if exposed to a gas. A separator is required to have electroconductivity, because it takes the role of a power collection electrode to collect the electric current generated in a power generation layer and to take it outside, besides the role of a gas flow path. Thus, as a separator for fuel cells, one obtained by applying press working on a plate (board) comprising conductive materials such as metal, carbon and the like or one obtained by applying cutting work such as end mill, fraise and the like on the plate (board) to form a groove to be a gas flow path, as shown in, for example, JP-A-10-125337 and JP-A-2000-36309 is generally employed.

However, it is difficult to make conventional separators thinner. This is because a plate requires a certain thickness in consideration of maintenance of processability (processing stability) during press working or cutting work of a metal plate, a carbon plate and the like. As a result, conventional fuel cells thicken naturally, which particularly makes it difficult to form a thin fuel cell. As a separator with the use of a metal plate, one using a plate of, for example, pure copper, stainless steel and the like is typical. However, since a separator with the use of a metal plate not only becomes heavier but is associated with the defects in that it is deteriorated by a long term contact with a hydrogen gas to be used as a fuel gas, cutting work and etching processing for groove formation are needed, thus increasing the number of steps and the cost, and when it is made thin, plastic deformation occurs, thus making shape retention difficult. In contrast, while a graphite plate is superior in gas impermeability and lightweight, it is expensive and requires a long time for the production of the graphite plate itself. Therefore, it is inferior in the productivity. Moreover, since processing of graphite plate requires slice cutting with a diamond cutter, the number of steps and the cost increase. Moreover, since a graphite plate has a high hardness, it easily gets broken when made thin.

SUMMARY OF THE INVENTION

The present invention has been made in view of the above-mentioned situation, wherein the object is provision of a separator for a fuel cell, which is lightweight and easily made thin, and which has superior corrosion resistance and shape stability and a fuel cell using the separator.

Another object of the present invention is provision of a wiring circuit board with a separator for a fuel cell, wherein a wiring circuit board constituting an electric apparatus and a separator for a fuel cell have been integrated, and a fuel cell built-in wiring circuit board using the same.

To achieve the above-mentioned object, the present invention has the following constitution.

Accordingly, the present invention relates to (1) a separator for a fuel cell, comprising an insulation layer, a groove for a gas flow path formed on one principal plane of the aforementioned insulation layer by being sectioned by a conductor pattern formed on one principal plane of the aforementioned insulation layer, a conductor terminal formed on the other principal plane of the aforementioned insulation layer, and a via hole penetrating through the aforementioned insulation layer and electrically connecting the aforementioned conductor terminal and the aforementioned conductor pattern, (2) the separator of the above-mentioned (1), further comprising a groove cut in a conductor pattern non-formed region on one principal plane of the insulation layer, wherein the bottom surface of the aforementioned groove becomes the bottom surface of a groove for a gas flow path, (3) the separator of the above-mentioned (1) or (2), wherein a surface of the conductor pattern is made of a noble metal, (4) a separator for a fuel cell, comprising an insulation layer, grooves for gas flow paths formed on both principal planes of the aforementioned insulation layer by being sectioned by conductor patterns formed on both principal planes of the aforementioned insulation layer, and a via hole penetrating through the aforementioned insulation layer and electrically connecting conductor patterns formed on the aforementioned both principal planes, (5) the separator of the above-mentioned (4), further comprising a groove cut in a conductor pattern non-formed region on at least one of the both principal planes of the insulation layer, wherein the bottom surface of the aforementioned groove becomes the bottom surface of a groove for a gas flow path, (6) the separator of the above-mentioned (4) or (5), wherein a surface of the conductor pattern is made of a noble metal, (7) a fuel cell comprising the separator of any of the above-mentioned (1)-(6), (8) a separator assembly for a fuel cell, which comprises plural separators according to the above-mentioned (1) or (2) on a single insulation layer, (9) a fuel cell assembly structure, wherein an electricity generating element assembly comprising plural electricity generation membrane electrode composite structures formed on a single electrolyte membrane is supported by being sandwiched between the separator assemblies of the above-mentioned (8) from both surfaces of top and bottom thereof,

(10) a fuel cell stack comprising two or more electricity generation cells stacked one upon another, wherein the separator according to the above-mentioned (4) or (5) is formed between two adjacent electricity generation cells, and the separator according to the above-mentioned (1) or (2) is formed on the outermost parts of both sides in the stacking direction of the electricity generation cell,

(11) a wiring circuit board with a separator for fuel cell, wherein a circuit and the separator according to any of the above-mentioned (1)-(6) are formed on a single insulation layer and the aforementioned circuit and the separator are electrically connected, and

(12) a fuel cell built-in wiring circuit board, wherein the fuel cell is composed of the separator of the above-mentioned (11).

The separator for fuel cell of the present invention has a structure wherein a conductive layer containing an electroconductive material (metal material) is partially formed on both principal planes of a substrate (insulation layer). Therefore, it can be easily made thin and lightweight, has flexibility, maintains strength even when made comparatively thin, and has superior shape stability. These are superior characteristics absent in conventional separators. Accordingly, effects such as realization of a lightweight fuel cell (fuel cell stack) thinner than conventional ones and improved vibration resistance, durability and the like of the cell can be afforded by the use of the separator.

In addition, a fuel cell (the fuel cell assembly structure of the present invention) wherein an electricity generating element assembly obtained by forming plural electricity generation membrane electrode composite structures on a single electrolyte membrane is supported by being sandwiched between the separator assemblies for fuel cell of the present invention from both surfaces of top and bottom thereof is thin and high power as well.

In addition, by constituting a fuel cell by the use of a separator of the wiring circuit board with a separator for fuel cell of the present invention integrating a wiring circuit board and a separator for fuel cell, a fuel cell built-in wiring circuit board wherein the fuel cell and the circuit (circuit element) are integrated on the same substrate can be obtained. In such a fuel cell built-in wiring circuit board, circuits and connectors for electric connection between a fuel cell and a circuit element are not necessary. Thus, it preferably satisfies the demand for small space and downsizing of compact electronic equipment.

Figure 1:
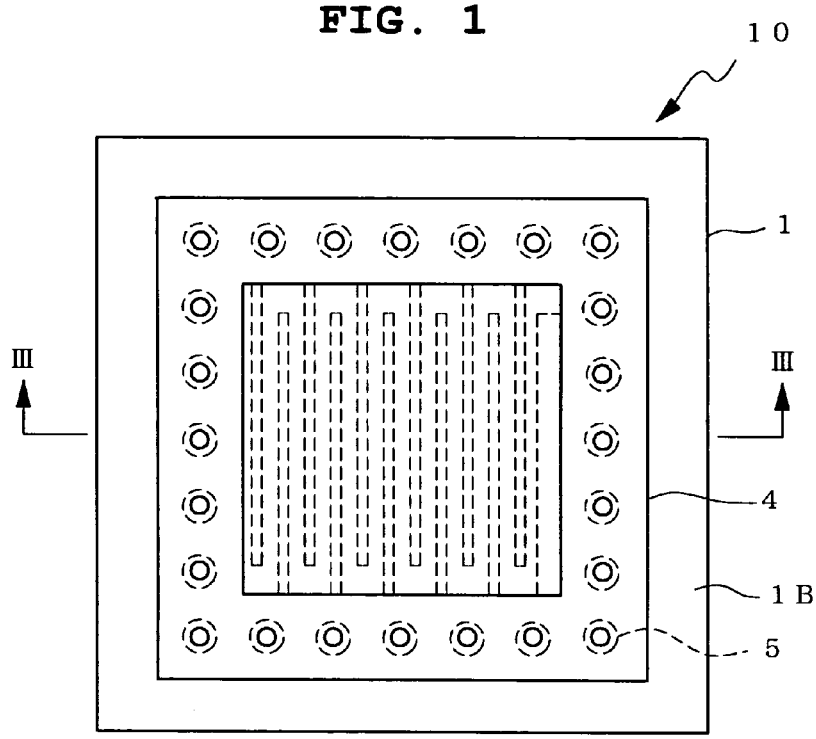
FIG. 1 is a plane view of a terminal side of one example (first example) of the separator for fuel cell in a first embodiment of the present invention.

The symbols in each drawing mean as follows.
1: insulation layer, 1A and 1B: principal planes of insulation layer, 2: conductor pattern, 3: groove for gas flow path, 4: conductor terminal, 5: via hole, 10: separator for fuel cell, 11: polymer electrolyte membrane, 12: fuel electrode, 13: oxygen electrode, 14: membrane electrode assembly (electric generation part), 15: adhesion layer, 100: fuel cell.

DETAILED DESCRIPTION OF THE INVENTION

The present invention is explained in more detail in the following by referring to the drawings.

Separator—First Embodiment

Figure 2:
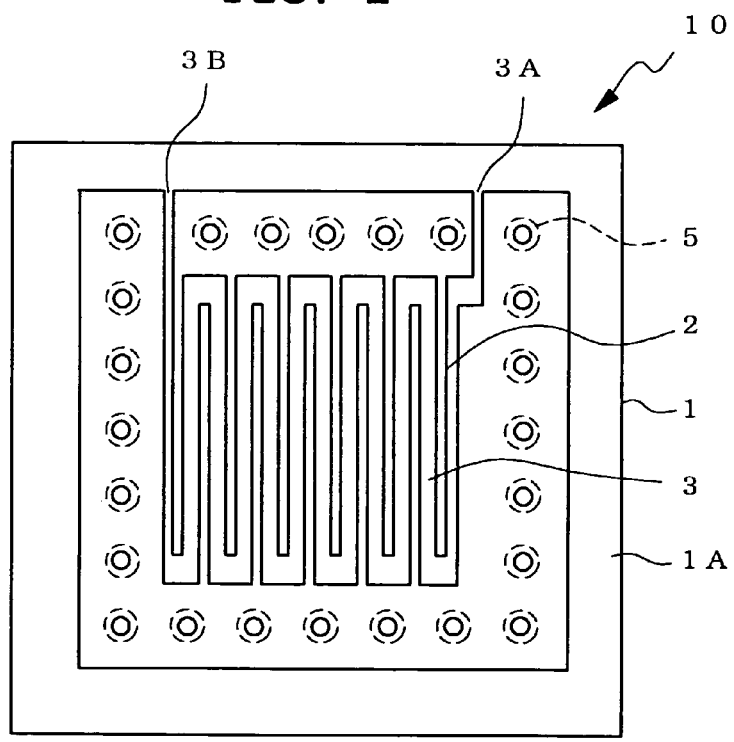
FIG. 2 is a plane view of a conductor pattern of one example (first example) of the separator for fuel cell in a first embodiment of the present invention.
Figure 3:
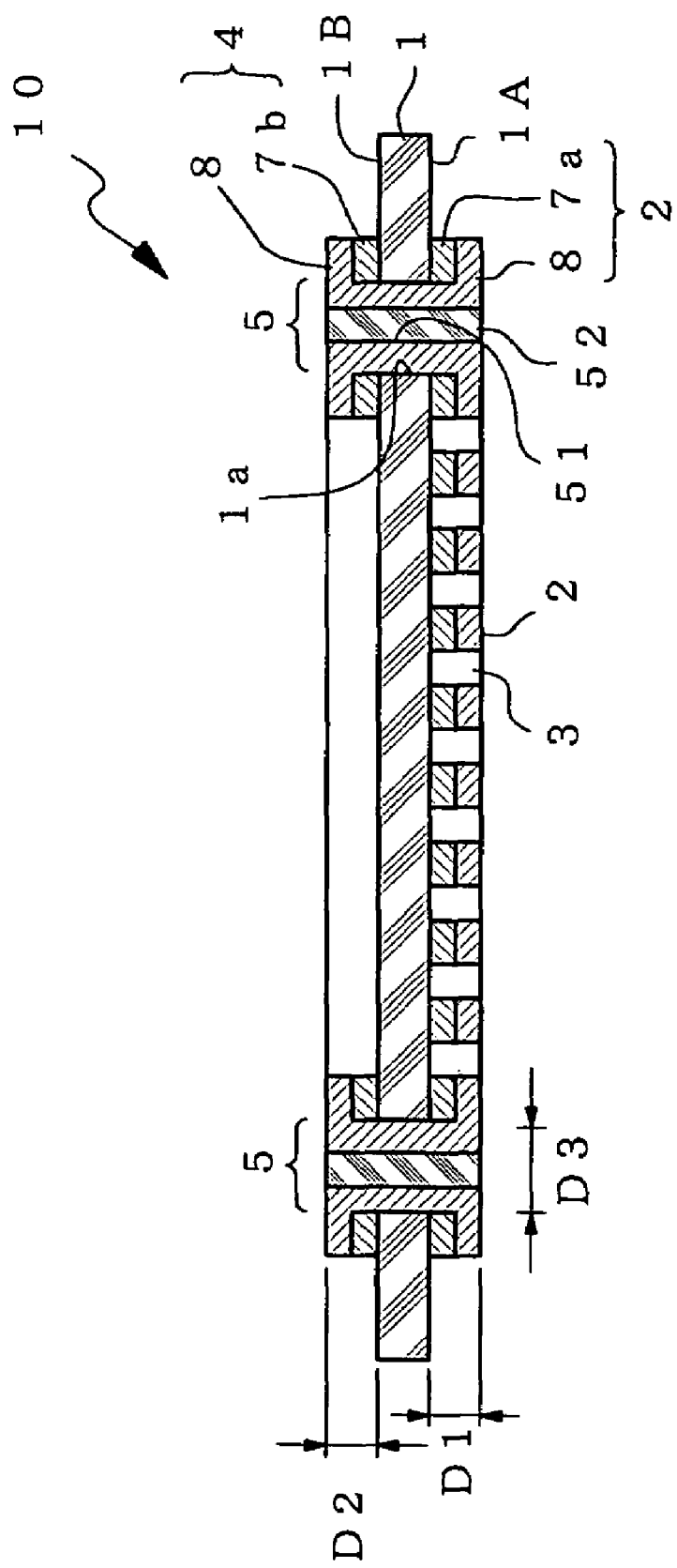
FIG. 3 is a sectional view of one example (first example) of the separator for fuel cell in a first embodiment of the present invention.

FIG. 1-FIG. 3 are simplified drawings of one example (first example) of a separator for a fuel cell in the first embodiment of the present invention, wherein FIG. 1 is a plane view on the terminal side, FIG. 2 is a plane view on the conductor pattern side, and FIG. 3 is a sectional view along the line III-III in FIG. 1.

The separator for fuel cell (hereinafter to be simply referred to as a "separator") in the first embodiment of the present invention has, as a basic constitution as shown in separator 10 of the first embodiment, a constitution wherein a conductor pattern 2 is formed on one principal plane 1A of an insulation layer 1 to form a groove for a gas flow path 3 sectioned by a conductor pattern 2 on the principal plane 1A, while forming a conductor terminal 4 on the other principal plane 1B of the insulation layer 1, and the conductor terminal 4 and the conductor pattern 2 are electrically connected by a via hole 5 penetrating the insulation layer 1.

As used herein, a groove for a gas flow path 3 is a groove like space sectioned by a conductive pattern 2 on the principal plane of the insulation layer 1, which becomes a flow path of a fuel gas or an oxygen gas when in use. One of both ends 3A, 3B of the groove for a gas flow path 3 becomes a flow inlet of the gas from the outside and the other becomes an outlet of the gas flown in.

Figure 4:
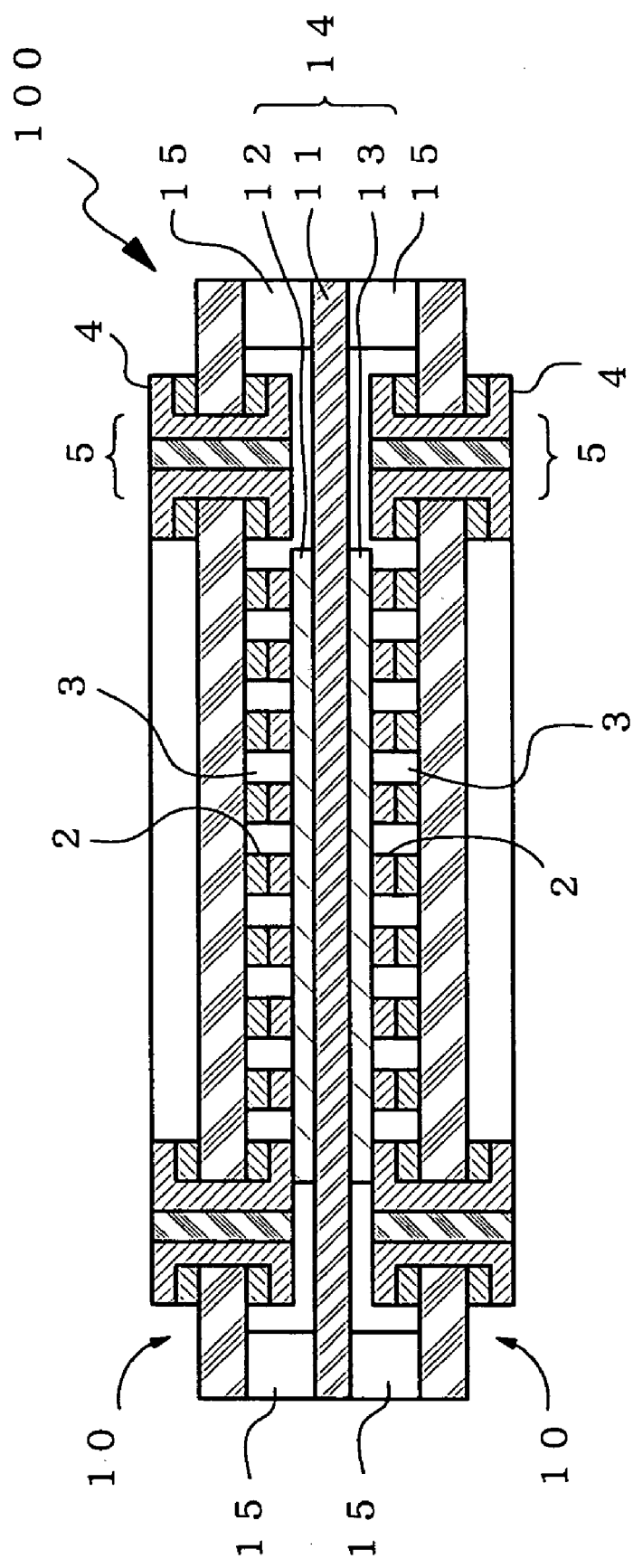
FIG. 4 is a sectional view of one example of a fuel cell (polymer electrolyte fuel cell) composed using the separator shown in FIGS. 1-3.

FIG. 4 is a simplified sectional view of one example of a fuel cell composed using the above-mentioned separator 10. A fuel cell 100 in this example is a polymer electrolyte fuel cell (PEFC). This fuel cell has a membrane electrode assembly 14 as an electric generation part, and separators 10 disposed on both principal planes of the membrane electrode assembly 14, wherein the membrane electrode assembly 14 comprises a fuel electrode 12 laminated on one principal plane of the polymer electrolyte membrane 11 and an oxygen electrode 13 laminated on the other principal plane, with a surface on the conductor pattern 2 side of each separator 10 disposed to face the membrane electrode assembly 14. A symbol 15 in the Figure shows an adhesion layer to connect the separator 10 and the membrane electrode assembly 14. The adhesion layer 15 is formed on the insulation layer 1 of the separator 10 and the polymer electrolyte membrane 11 of the membrane electrode assembly 14. The adhesion layer 15 also acts as a spacer to contact the conductor pattern 2 with an electrode (fuel electrode 12, oxygen electrode 13) at a low contact pressure that does not damage an electrode material constituting an electrode (fuel electrode 12, oxygen electrode 13) of the membrane electrode assembly 14.

As shown in the fuel cell 100 of this example, the separator 10 in the first embodiment of the present invention is mainly used as a separator of a fuel cell consisting of a single power generation cell. The current generated by the membrane electrode assembly 14 is collected by the conductor pattern 2 of this separator 10, led to the conductor terminal 4 through the via hole 5 and taken out from the cell from an exterior circuit (not shown) connected to the conductor terminal 4.

In the separator of the present invention, for example, various plastic films such as a polyethylene film, a polypropylene film, a polystyrene film, a polyvinyl chloride film, a polyethylene terephthalate film, a polycarbonate film, TPX (methylpentene resin film), an alkyd resin film, a polyimide film, a polysulphone film, a polyethersulphone film, a polyamide film, a polyamideimide film, a polyetherketone film, a polyphenylene sulfide film and the like are used for the insulation layer 1. A composite material (composite substrate) known as a base substrate of a wiring circuit board (printed wiring circuit board), which is obtained by impregnating one or more matrix materials selected from paper, glass fabric and nonwoven paper with a thermosetting resin (e.g., epoxy resin, BT resin, aramid resin, phenol resin etc.) is preferably used as the insulation layer 1, because it is superior in processability.

The thickness of the insulation layer 1 is not particularly limited and is preferably 0.1-10.0 mm, more preferably 0.5-2.0 mm. This is because a thinner insulation layer can make a thinner separator, and when the thickness of the insulation layer 1 is less than 0.1 mm, inconveniences may occur such as lower contact pressure between a collector layer (each electrode) and a conductor pattern within the cell, lower contact pressure between polymer electrolyte membrane and catalyst components on each electrode surface, lower mechanical strength and the like. When the thickness of the insulation layer 1 exceeds 10.0 mm, the separator comes to have a greater strength but fails to become thin, which prevents sufficient achievement of the object of the present invention.

As shown in the separator 10 and fuel cell 100 in the aforementioned example, the "conductor pattern 2" of the separator of the present invention is a conductive layer composed of an electroconductive material, which is formed on the principal plane of the insulation layer 1, for the purpose of forming a groove (groove pattern) to be a gas flow path 3 on the principal plane of the insulation layer 1. The "conductor terminal 4" is a conductive layer composed of an electroconductive material, which is formed on the principal plane of the insulation layer 1 on the opposite side of the principal plane, on which the conductor pattern of the insulation layer 1 has been formed, and becomes a terminal (contact end to be connected with the outside wiring) to take out the current generated in the electric generation part (membrane electrode assembly 14) of the cell. Accordingly, the conductor terminal 4 is not formed on the entire surface of the insulation layer 1 in view of lightweighting of the separator, cost and the like, but preferably formed along the periphery of the laminated part (fuel electrode 12/membrane 11/oxygen electrode 13) of the membrane electrode assembly 14 of the cell, as shown in FIG. 4.

In the separator of the present invention, the materials of the conductor pattern 2 and the conductor terminal 4 are not particularly limited as long as they show electric conduction, and known metal materials, electroconductive paste and the like can be mentioned. As the metal material, for example, metals such as gold, silver, copper, platinum, lead, tin, nickel, cobalt, indium, rhodium, chrome, tungsten and ruthenium, various alloys containing at least two kinds selected from these (e.g., solder, nickel—tin, gold—cobalt etc.), corrosion resistance alloys such as stainless steel and the like, and the like can be mentioned. As the electroconductive paste, one obtained by dispersing a metal powder such as gold, silver, copper, platinum, tin, nickel, lead and the like, or a carbon powder and the like in a binder which is a mixture of one or more kinds selected from epoxy resin, phenol resin, polyimide resin, polyamideimide resin, silicone resin, fluorine resin and the like can be mentioned. Of these electroconductive materials, a metal material is preferable from the aspect of electroconductivity, and a material containing at least a good electrical conductor such as copper, nickel and the like used as general circuit materials of wiring circuit boards is preferable. In addition, the conductor pattern 2 and the conductor terminal 4 may be each a single layer structure or a multi-layer structure, and in at least the conductor pattern 2, at least a surface (exposed surface) thereof is preferably made of a noble metal such as gold, platinum, silver and the like, and at least a surface (exposed surface) of both the conductor pattern 2 and the conductor terminal 4 is more preferably made of a noble metal such as gold, platinum, silver, palladium and the like. By constituting the surface of the conductor pattern 2, conductor terminal 4 and the like with a noble metal, corrosion resistance can be improved and reliability of the separator can be improved, and further, an effect of suppression of generation of metal ion caused by deterioration of polymer electrolyte membrane can be afforded. Accordingly, a most preferable embodiment of the conductor pattern and/or terminal is a multi-layer structure comprising a base layer made of a good electrical conductor such as copper, nickel and the like and a noble metal layer laminated thereon.

It is preferable to form the conductor pattern 2 and the conductor terminal 4 from the same material because the number of production steps of the separator can be reduced, but they may not be necessarily made from the same material. A material suitable for each may be selected from the aspects of function and cost of each of the conductor pattern 2 and the conductor terminal 4 in the separator.

In the separator of the present invention, the thickness (D1 in FIG. 3) of the conductor pattern 2 corresponds to the thickness (height) of the gas flow path 3 of the separator. Therefore, the thickness of the conductor pattern 2 is selected from the range of preferably 1-1000 μm, more preferably 10-200 μm, depending on the characteristics and the like of the electrolyte membrane constituting the membrane electrode assembly 14 as an electric generation part of a fuel cell. On the other hand, while the thickness (D2 of FIG. 3) of the conductor terminal 4 is not particularly limited, the same thickness as the conductor pattern is preferable, 1-1000 μm is preferable, 10-200 μm is more preferable because the material cost can be reduced and the separator and the conductor terminal can be prepared simultaneously in a single step.

In the present invention, the shape of the conductor pattern 2 is not limited to those shown in FIG. 1-FIG. 3 (shape of two pectinate patterns are faced to each other inside the rectangular ring-like frame pattern), and may be various shapes, preferably a shape capable of stabilizing the entire shape of the separator and ensuring a groove for a gas flow path capable of sufficiently contacting a gas with an electrode of the electric generation part (membrane electrode assembly 14).

In the separator of the present invention, the via hole 5 is formed to penetrate the insulation layer 1, thereby to electrically connect the conductor pattern 2 and the conductor terminal 4, but the shape thereof is not particularly limited. The "via hole" of the present invention means the same as the "via hole" used in the electric apparatus field. More particularly, it means a conductive channel penetrating the insulation layer, which aims at electrically connecting conductive layers (conductive layers formed on one principal plane of the insulation layer and the other principal plane) separated by the insulation layer in a wiring circuit board. Therefore, the shape of a known via hole (conductive channel) in a wiring circuit board can be applied as it is as a via hole of the present invention. The via hole of a separator preferably does not have a through-hole, in consideration of preventing undesirable leakage of a gas introduced into a battery cell. Accordingly, (i) a configuration comprising a conductive layer which covers an inner surface of a through-hole formed on an insulation layer and implanting materials to fill a through-hole formed inside the conductive layer, (ii) a configuration wherein the through-hole formed in an insulation layer is completely filled with an electroconductive material, and the like are preferable. An undesirable leakage of a gas (fuel gas, oxygen gas) introduced into a battery cell can be prevented by these configurations. For production of a via hole, a blind via production method is also applicable. The blind via production method is known as a via hole production method that does not form a through-hole from the initial stage of the production step of a wiring circuit board.

Figure 5:
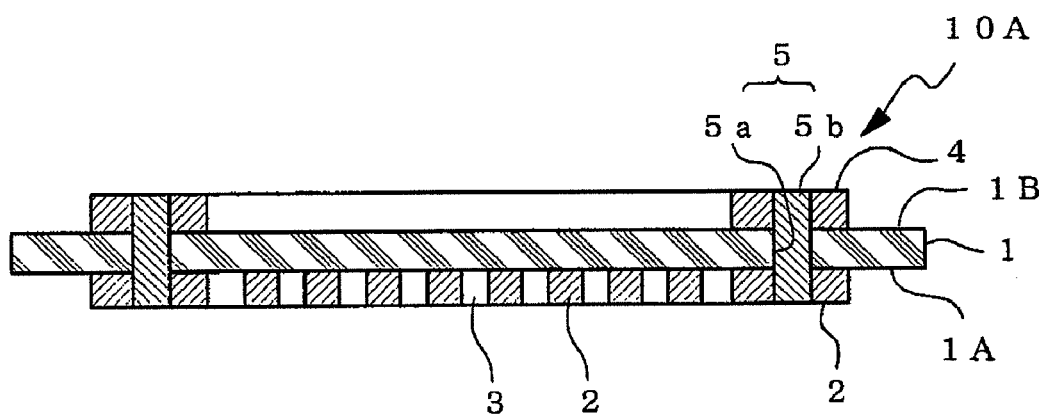
FIG. 5 is a sectional view of a different example (second example) of a first mode of the separator for fuel cell of the present invention.

The via hole 5 in the separator 10 of one example shown in FIGS. 1-3 is a via hole of the configuration of the above-mentioned (i). The inside through-hole 51 in the conductive layer 8 covering the inner surface of the through-hole 1a in the insulation layer 1 is filled with an implanting material 52. FIG. 5 is a different example (second example) of the first embodiment of the separator of the present invention. This separator 10A has a via hole 5 of the configuration of the above-mentioned (ii). To be precise, the via hole 5 comprises a through-hole 5a obtained by perforating the laminate of conductor terminal 4/insulation layer 1/conductor pattern 2 and an electric conductive material 5b filled in the through-hole 5a.

The via hole in the separator of the present invention can be formed by a method similar to that for known via holes in wiring circuit boards in the electric apparatus field, which is specifically plating, printing, implanting of metal piece and the like. Accordingly, as an electroconductive material constituting a via hole, for example, metal materials such as gold, copper, nickel, solder and the like and an electroconductive paste exemplified as a material for the aforementioned conductor pattern and terminal, and the like can be used.

When, along with the formation of a via hole, the through-hole is implanted, as the implanting material, epoxy resin, silicone resin, fluorine resin, polyimide resin, ceramics, metal and the like can be mentioned. Of these, epoxy resin, silicone resin, fluorine resin and the like are preferable from the aspects of prevention of gas leakage and water resistance.

In the present invention, the size of the via hole 5, in other words, the maximum value of the width (D3 in FIG. 3) in the section perpendicular to the axis of the via hole is not particularly limited, but is preferably 0.01-5 mm, more preferably 0.05-1 mm, from the aspect of easy processing, ensured current volume, and easiness of implanting.

Figure 6:
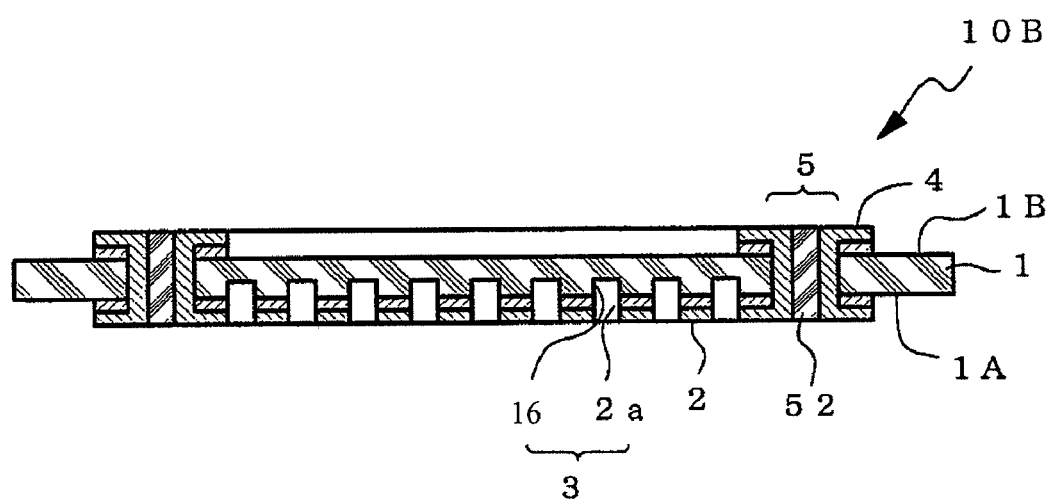
FIG. 6 is a sectional view of a different example (third example) of a first mode of the separator for fuel cell of the present invention.

FIG. 6 is a sectional view of a different example (third example) of a first embodiment of the separator of the present invention. This separator 10B comprises a groove for a gas flow path 3 formed by a groove 2a sectioned by the conductor pattern 2 on the principal plane of the insulation layer 1 and groove 16 cut in the principal plane of the insulation layer 1. As long as such constitution is achieved, even if the thickness of the conductor pattern 2 is thinner than that of the separator 10 of the aforementioned first example, a groove for a gas flow path 3 having the same groove height (depth) can be realized, and as a result, an electroconductive material for forming a conductor pattern can be saved. This is more effective in making the entire separator thinner.

When groove 16 is too deep, the strength of the insulation layer decreases and the durability of the separator is degraded. Therefore, the depth of the groove is preferably not more than about 75% of the thickness of the insulation layer.

FIGS. 7((a)-(d)) show one example of the production step of the separator 10 shown in FIGS. 1-3. The production method of the separator of the present invention is explained in the following by referring to these Figures.

Figure 7A:
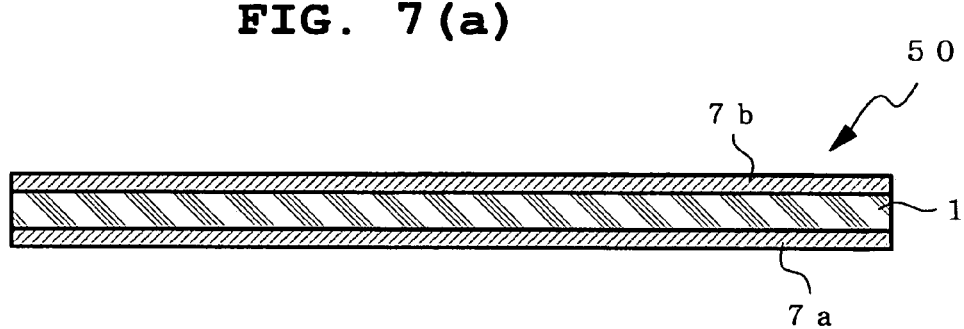
FIGS. 7((a)-(d)) are different sectional views of each production step of the separator shown in FIGS. 1-3.

First, a laminate plate (film) 50 wherein conductive layers 7a, 7b are laminated on both surfaces of the insulation layer 1 is prepared (FIG. 7(a)). The conductive layers 7a, 7b are conductive layers each becomes a terminal or a conductor pattern. As a method for forming conductive layer 7a, 7b of the laminate plate 50, lamination of foils such as a metal foil and the like, one or more in combination which is/are selected from vapor deposition, sputtering, printing, electrochemical metalizing and ion plating, a combination of these with plating and the like can be mentioned.

Figure 7B:
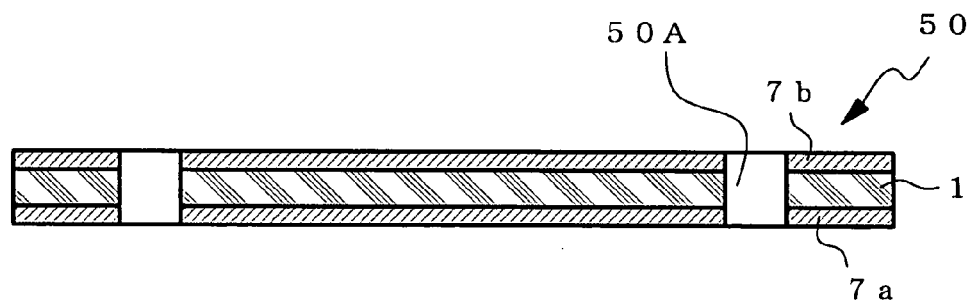

Then, a through-hole 50A that penetrates the laminate plate 50 in the thickness direction is formed in the laminate plate (film) 50 at the predetermined site to form a via hole (FIG. 7(b)). As a method for forming this through-hole 50A, a method such as mechanical processing using a drill, laser processing, plasma etching, punch processing and the like can be mentioned. For forming of a blind via hole, a laser processing is suitable.

Figure 7C:
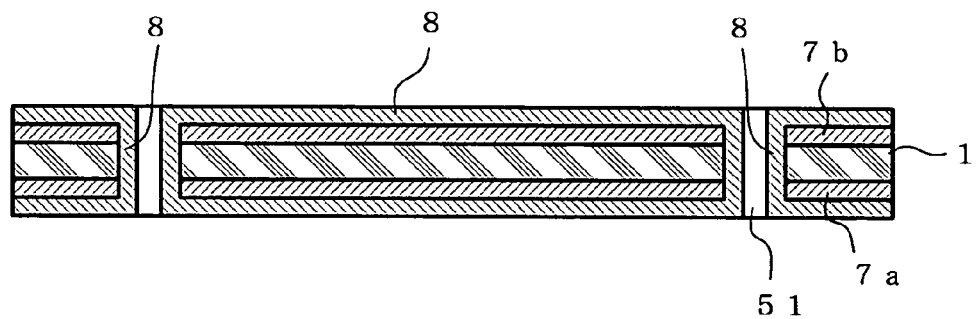

Thereafter, the via hole 5 is formed by, for example, forming a conductive layer (metal layer) 8 covering the inner surface of through-hole 50A by plating (FIG. 7(c)). Formation of the conductive layer (metal layer) 8 by plating may be selectively conducted for through-hole 50A and vicinity thereof, but it increases the number of steps and production cost. This is because a step for forming a mask on the part of the laminate plate (film) 50 is necessary, where growth of a metal layer by plating is not desired. Accordingly, preferably, plating is applied to the entire surface of the laminate plate (film) 50. In this case, a conductive layer (metal layer) 8 is formed by plating not only on the inner surface of the through-hole 50A but also on the conductive layers 7a, 7b on both surfaces of the insulation layer 1 (FIG. 7(c)). For setting the thickness of each of the conductive layers 7a, 7b, therefore, the total thickness of the growth thickness of the conductive layer (metal layer) 8 to make the electric conductivity of the via hole sufficient and the thickness of the conductive layer 7a (7b) is preferably a desired thickness (see D1 of FIG. 3) of conductor pattern 2 or a desired thickness (see D2 of FIG. 3) of terminal 3.

Figure 7D:
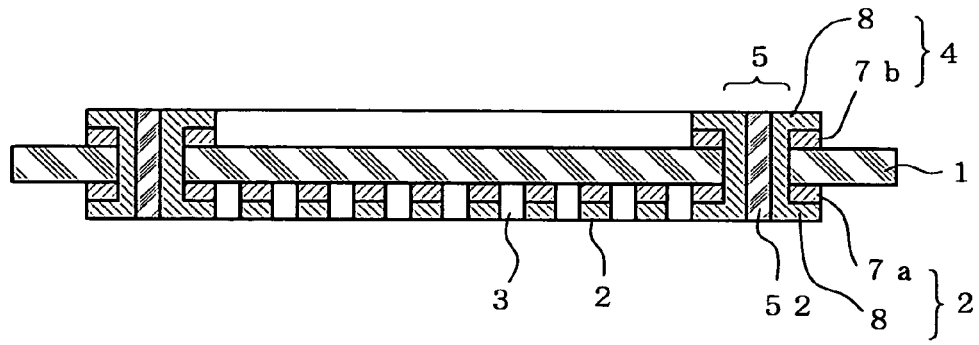

Then, the through-hole 51 in the via hole 5 is filled with the implanting material 52 (FIG. 7(d)).

When a via hole 5 of the configuration of FIG. 5 is to be formed, for example, an electroconductive paste is filled in the through-hole 50A by printing or a metal layer alone is selectively grown in the through-hole 50A by electric plating.

Now the conductive layers (conductive layer 7a and conductive layer 8 and conductive layer 7b and conductive layer 8) on both principal planes of the insulation layer 1 of the laminate plate 50 are patterned in a predetermined shape, thereby forming a conductor pattern 3 on one principal plane of the insulation layer 1 and a conductor terminal 4 on the other principal plane of the insulation layer 1 (FIG. 7(d)). This patterning is preferably performed by etching a conductive layer masked with a pattern of a photo resist, in the same manner as in the circuit formation (circuit pattern formation) during production of the wiring circuit board.

As the photo resist, known dry film resist, liquid resist and the like used for the production of wiring circuit board can be mentioned, with preference given to a dry film resist from the aspects of production cost and the like. Of dry film resists, an acrylic dry film resist is preferable from the aspect of acid resistance. When a liquid resist is used, a resist membrane is formed by screen printing, spin coater and the like. When a dry film resist is used, the resist is pressed with a suitable roller to settle the resist on the conductive layer.

As a forming means of a resist pattern, in other words, a means for forming an opening in a resist membrane, laser processing, photolithography and the like can be mentioned. From the aspects of size precision and processing cost, photolithography is preferable. The photolithography is a process to form an opening by exposure via a photomask, followed by development.

In this way, the separator of the present invention can be prepared in the same manner as in a wiring circuit board used for various electric apparatuses and the like. The separator of the present invention can be produced by a smaller number of steps and in a short time as compared to conventional separators wherein a groove is formed on a plate of a metal, carbon and the like by a slice processing, cutting work and the like. Like preparation of plural wiring circuit boards all at once on a large area of a base substrate, plural separators can be prepared all at once on an insulation layer (plastic film, base substrate for wiring circuit board etc.) having a large area. Thereafter, they can be cut into individual separators to give plural separators, thus further reducing the production cost.

Separator—The Second Embodiment

Figure 8:
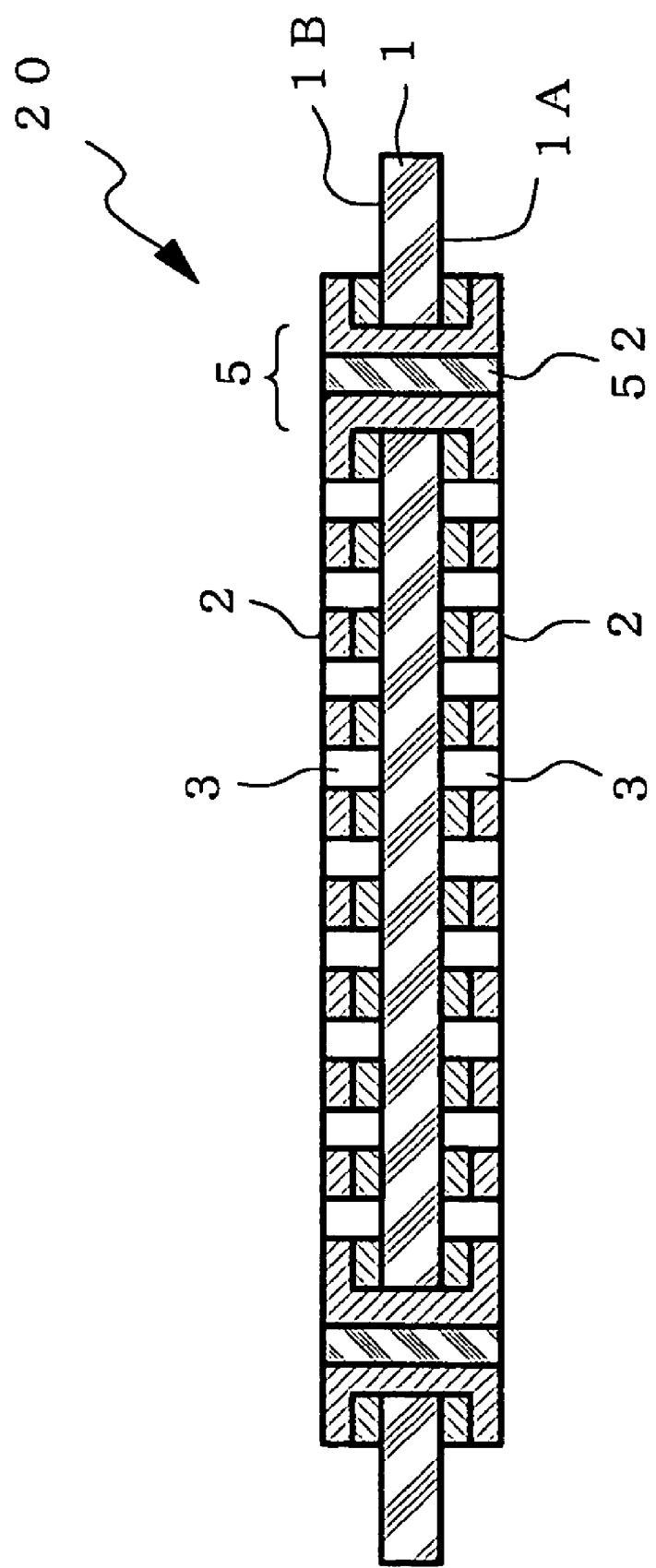
FIG. 8 is a sectional view of one example of the separator for fuel cell in the second embodiment of the present invention.

FIG. 8 is a simplified sectional view of one example of a separator of the second embodiment of the present invention. As shown in this separator 20, the separator of the second embodiment of the present invention has conductor patterns 2 on both principal planes 1A, 1B of the insulation layer 1, and grooves for a gas flow path 3 are formed on each surface of both principal planes 1A, 1B of the insulation layer 1. One side and the other side in the plane view of the separator are the same as in the aforementioned FIG. 1.

In the present invention, the separator of the second embodiment can be produced by basically the same steps as the separator in the aforementioned first embodiment, and more specifically, can be produced by forming and patterning conductive layers on both principal planes of the insulation layer 1, such that the conductive layer on both principal planes becomes a conductor pattern 2 to section the groove for a gas flow path 3.

This separator of the second embodiment is mainly used as a separator to be commonly used between adjacent power generation cells in a fuel cell stack comprising plural power generation cells containing a membrane electrode assembly.

In the same manner as in the separator 10B of the aforementioned FIG. 6, in the separator of the second embodiment, too, a groove for a gas flow path 3 may be formed by a conductor pattern formed on the principal plane of the insulation layer 1 and a groove cut in the principal plane of the insulation layer 1. In this case, a groove cut on both principal planes are preferably not present at the corresponding positions, from the aspects of the strength of the insulation layer and shape stability, and the depth of the groove is preferably not more than about 75% of the thickness of the insulation layer.

Since the separator of the present invention has a structure comprising an insulation layer (plastic film, base substrate for wiring circuit board etc.) as a substrate and a conductive layer made from an electroconductive material (metal material) partially formed on both principal planes of the substrate, it has superior characteristics absent in conventional separators in that it can be made thin and lightweight easily, has flexibility, retains high strength even when made comparatively thin, and has superior shape stability.

<Fuel Cell>

When the separator of the present invention is used to prepare a fuel cell, as shown in the aforementioned example of FIG. 4, an insulation layer (plastic film, base substrate for wiring circuit board etc.) of the separator and an electrolyte membrane 11 of the membrane electrode assembly 14 are adhered via an adhesion layer 15 to seal a cell. For such adhesion layer 15, any material can be used without particular limitation as long as it shows adhesiveness to the insulation layer 1 of the separator and the electrolyte membrane of the membrane electrode assembly 14. Generally, the material of the insulation layer to be used for the separator of the present invention shows adhesiveness to an electrolyte membrane of known fuel cells. Thus, plastic materials and composite materials of the same kind as this insulation layer can be used as a material of the adhesion layer 15. Of these, a composite material obtained by impregnating a matrix material with a thermosetting resin is preferable from the aspects of gas leakage prevention, shape retention (particularly, prevention of deformation under an inside pressure), heat resistance, anticorrosiveness, adhesive power and the like. As used herein, a matrix material is one or more kinds of materials selected from paper, glass and nonwoven paper. As the thermosetting resin, for example, epoxy resin, BT resin, aramid resin, phenol resin and the like are mentioned.

<Fuel Cell Stack>

Figure 9:
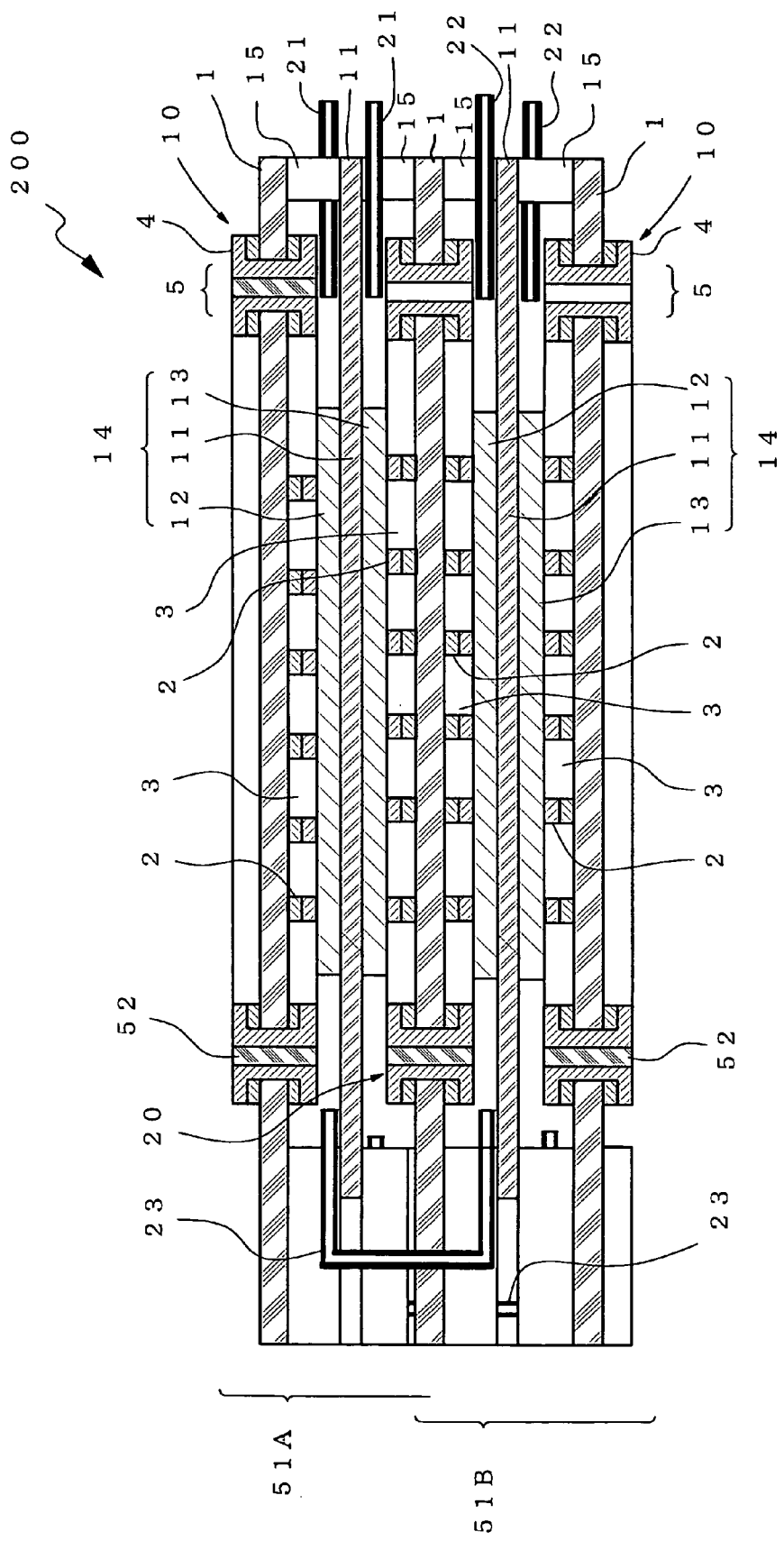
FIG. 9 is a sectional view of one example of a fuel cell stack of the present invention.

FIG. 9 is a simplified sectional view of one example of a polymer electrolyte fuel cell (PEFC) stack prepared using the separator 20 of FIG. 8 and the separator 10 of the first embodiment shown in FIGS. 1-3. The fuel cell stack 200 consists of two power generation cells 51A and 51B in stack. More specifically, it comprises a membrane electrode assembly 14 set on one surface side and the other surface side of the insulation layer 1 via a separator 20 comprising a conductor pattern 2 (a groove for a gas flow path 3) formed on both principal planes of the insulation layer 1, and a separator 10 further set on a surface on the opposite side from the separator 20 of said two membrane electrode assemblies 14.

As used herein, ends of the periphery of the both surfaces of the insulation layer 1 of the separator 20 and polymer electrolyte membrane 11 of the membrane electrode assembly 14 are adhered via an adhesion layer 15, and an end of the periphery of one surface of the insulation layer 1 of the separator 10 and the polymer electrolyte membrane 11 of the membrane electrode assembly 14 are adhered via an adhesion layer 15. In this way, each power generation cell is sealed.

In addition, a pipe 21 is embedded in one part of the adhesion layer 15 that adheres a polymer electrolyte membrane 11 of the membrane electrode assembly 14 of one power generation cell 51A and the insulation layers 1 of the separators 10, 20, and the pipe 21 introduces a gas such as a fuel gas, oxygen gas or air from the outside into the cell. A pipe 22 is embedded in one part of the adhesive layer 15 that adheres a polymer electrolyte membrane 11 of the membrane electrode assembly 14 of the other power generation cell 51B and the insulation layers 1 of the separators 10, 20, and the pipe 22 exhausts a gas such as a fuel gas, oxygen gas or air inside the cell to the outside. Furthermore, a pipe 23 is embedded in a part different from the part, where the above-mentioned pipes 21, 22 are set, of each adhesion layer 15 of the power generation cell 51A and power generation cell 51B, and the pipe 23 delivers a gas such as a fuel gas, oxygen gas or air from the inside of the power generation cell 51A to the inside of the power generation cell 51B. In this way, a gas such as a fuel gas, oxygen gas or air from the outside is exhausted to the outside through the inside of two power generation cells 51A, 51B. As the pipes 21-23, for example, a stainless steel tube, silicone tube, polypropylene tube and the like are preferable from the aspects of gas impermeability, mechanical strength, anticorrosion property, folding property and the like.

Figure 10:
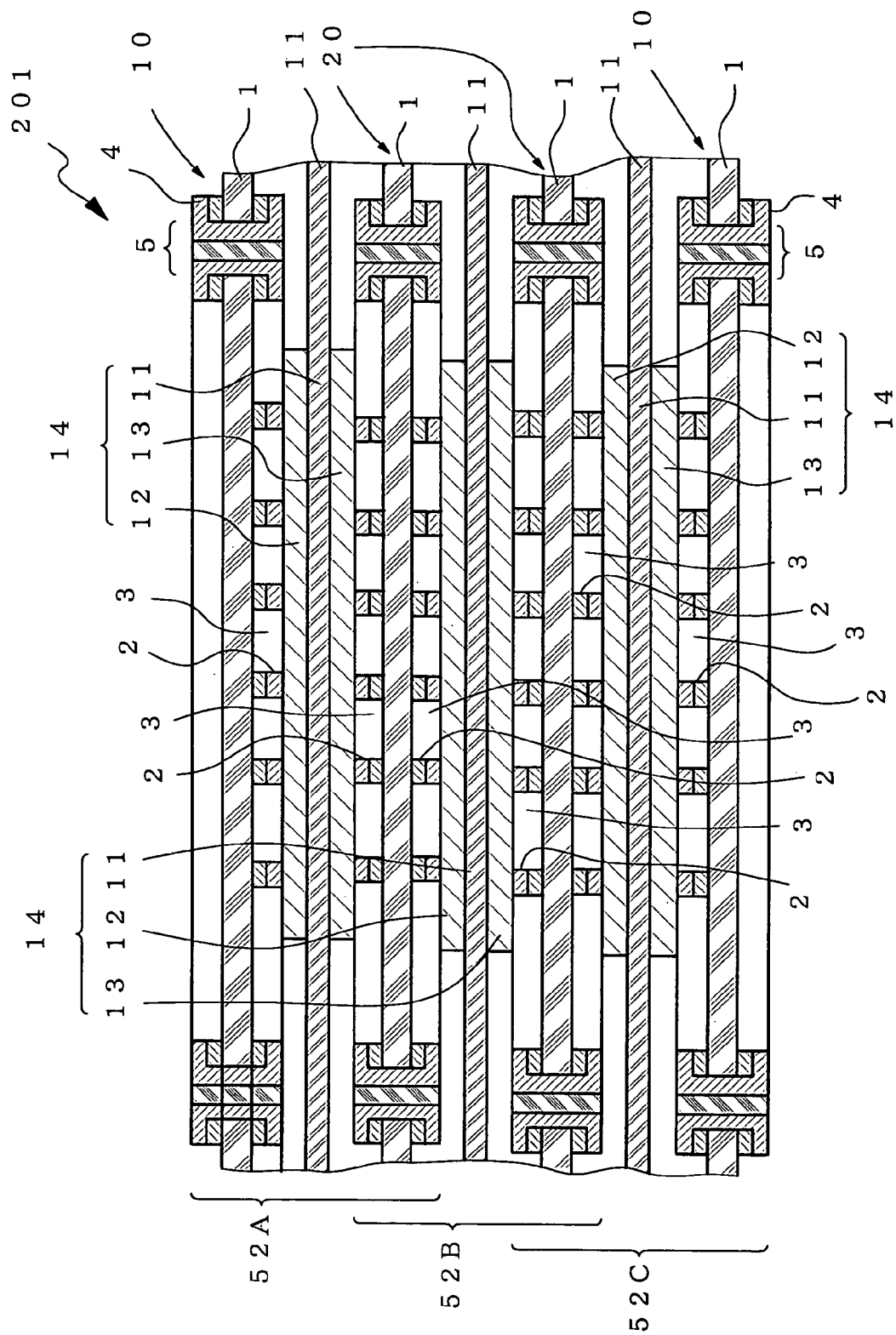
FIG. 10 is a sectional view of the main part of another example of the fuel cell stack of the present invention.

The fuel cell stack 200 in the embodiment of FIG. 9 consists of two power generation cells in stack. To obtain a cell having a higher power, the fuel cell stack of the present invention may consist of three or more power generation cells in stack. A stack consisting of two power generation cells need only to have one sheet of separator with a groove formed on both surfaces. On the other hand, a stack consisting of three or more power generation cells has not less than one power generation cell sandwiched between two separators, wherein the aforementioned two sheets of separators are separators of the adjacent power generation cell. Accordingly, as shown in FIG. 10, for example, as the two sheets of separators set on both surfaces of the intermediate power generation cell 52B in a fuel cell stack 201 comprising three power generation cells 52A-52C, a separator 20 comprising grooves formed on both surfaces is used. As the number of the power generation cells that a fuel cell stack has increases to 4 sheets, 5 sheets and the like, the number of power generation cells sandwiched between two sheets of separators with grooves formed on both surfaces increases. Accordingly, as the number of the power generation cells that a fuel cell stack has increases, the fuel cell stack of the present invention becomes thinner than conventional fuel cell stacks.

<Separator Assembly>

Figure 11A:
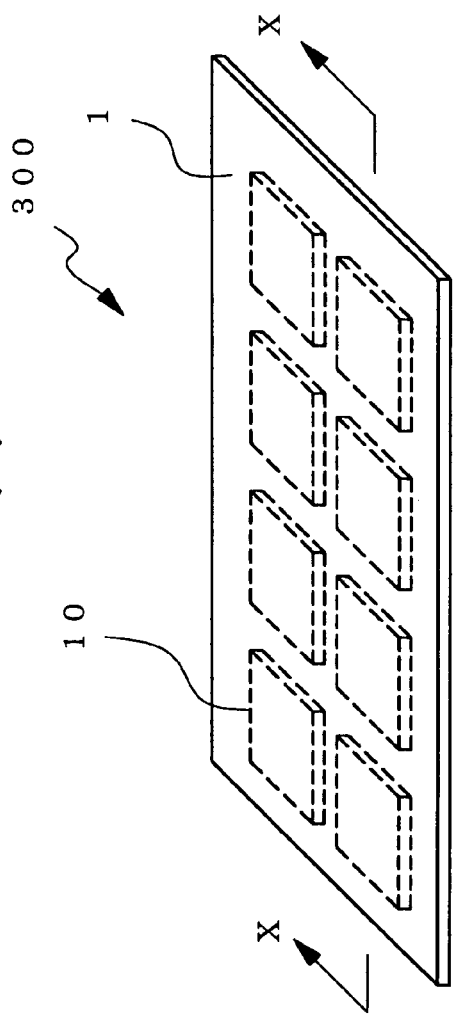
FIG. 11(a) is a simplified perspective view of one example of a separator assembly for fuel cell of the present invention.
Figure 11B:
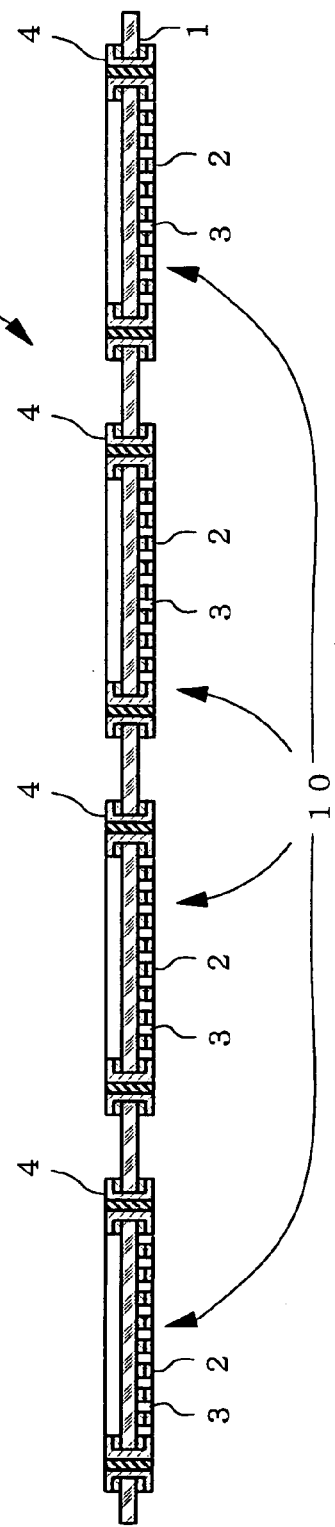
FIG. 11(b) is a sectional view of FIG. 11(a) along the line X-X.

FIG. 11(a) is a simplified perspective view of one example of a separator assembly wherein the separators 10 shown in FIGS. 1-3 are formed in plural areas of a single insulation layer 1 and respective separators 10 are electrically connected, and FIG. 11(b) is a sectional view of FIG. 11(a) along the line X-X.

As shown in the separator assembly 300 in this example, the separator assembly of the present invention comprises a single insulation layer 1 and plural separators of the present invention (separators 10) formed thereon. The plural separators of the present invention (separators 10) can be formed integrally in the same step using the production method of wiring circuit board as it is. A separator that connects electrically can be selected appropriately from plural separators 10 depending on the desired current and electric power of the cell assembly to be prepared using a separator assembly. A method for electrically connecting plural separators is not particularly limited, and a circuit layer (not shown) that connects conductor terminals 4 of different separators 10 is preferably formed simultaneously in the formation of conductor terminals 4 during the production of plural separators 10. In other words, it is preferable to form terminals of separators and circuit patterns linked to the terminals by patterning a conductive layer formed on the principal plane of the insulation layer. By forming a circuit pattern in this way, different separators can be electrically connected without preparing another connecting means such as a wiring circuit and the like. As a result, the number of production steps can be reduced and the production cost can be also reduced. Furthermore, all circuits can be formed on the same plane and the circuit does not protrude in the thickness direction, which makes it easier to make a thin cell.

The separator assembly 300 shown in FIG. 11 comprises a collection of one-surface-groove type separators 10 (see FIGS. 1-3) having conductor patterns (a groove for a gas flow path) formed on one principal plane of the insulation layer. Similarly, a separator assembly may consist of both surface groove type separator 20 (see FIG. 8) comprising conductor pattern (a groove for a gas flow path) formed on both principal planes of the insulation layer.

<Fuel Cell Assembly Structure>

Figure 12A:
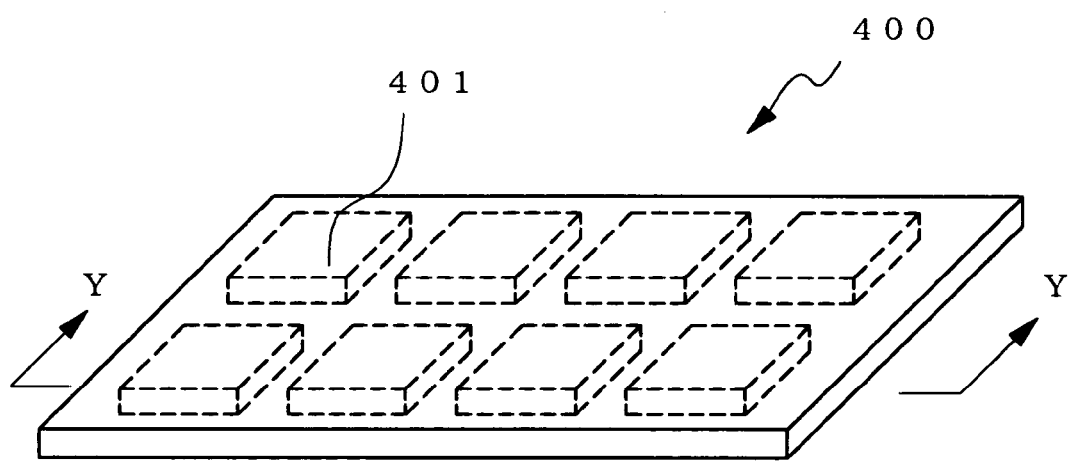
FIG. 12(a) is a simplified perspective view of one example of a fuel cell assembly structure of the present invention.

FIG. 12(a) is a simplified perspective view of one example of a fuel cell assembly structure using the separator assembly of the present invention, and FIG. 12(b) is a sectional view of FIG. 12(a) along the line Y-Y. In these Figures, the same symbols as in FIGS. 1-3, 4, 11 show the same or corresponding parts. The fuel cell assembly structure 400 of this example comprises an electricity generating element assembly 350 and a separator assembly 300, and corresponds to one comprising plural cell units (power generation cells) 401 arranged in parallel on the same plane and integrated. As used herein, the electricity generating element assembly 350 comprises an (electricity generating) membrane electrode assembly 14' (fuel electrode 12/electrolyte membrane 11/oxygen electrode 13) formed in each of the plural areas of a single large area electrolyte membrane 11, and the separator assembly 300 (see FIG. 11) supports by sandwiching the electricity generating element assembly 350 from the both principal plane sides.

In plural cell units (power generation cells) 401, adjacent cell units (power generation cells) communicate via a pipe 24. The pipe 24 is inserted in each adhesion layer 15 on the fuel electrode 12 side and oxygen electrode 13 side of a membrane electrode assembly 14' inside the cell unit (power generation cell). With the pipe 24, a gas (fuel gas and oxygen gas (air)) introduced into the structure 400 from the outside passes the plural cell units (power generation cells) and exhausted from the structure 400.

In this way, the fuel cell assembly structure of the present invention does not stack plural power generation cells as in a fuel cell stack, but places plural power generation cells in parallel on the same plane, which realizes a thin and high power cell. In plural cell units (power generation cell) 401 of the fuel cell assembly structure 400 in the above-mentioned example, adjacent cell units communicate within the unit via the pipe 24. However, a gas may be individually introduced and discharged in every cell unit (power generation cell), or the inside of some of the adjacent cell units (power generation cells) may be communicated with a pipe and a gas may be individually introduced and discharged in other cell units (power generation cells). The mode of gas introduction and discharge can be appropriately changed depending on the kind of a tool for incorporating a fuel cell assembly structure and desired quantity of power generation (current, voltage) and the like.

<Wiring Circuit Board with a Separator for Fuel Cell>

Figure 13:
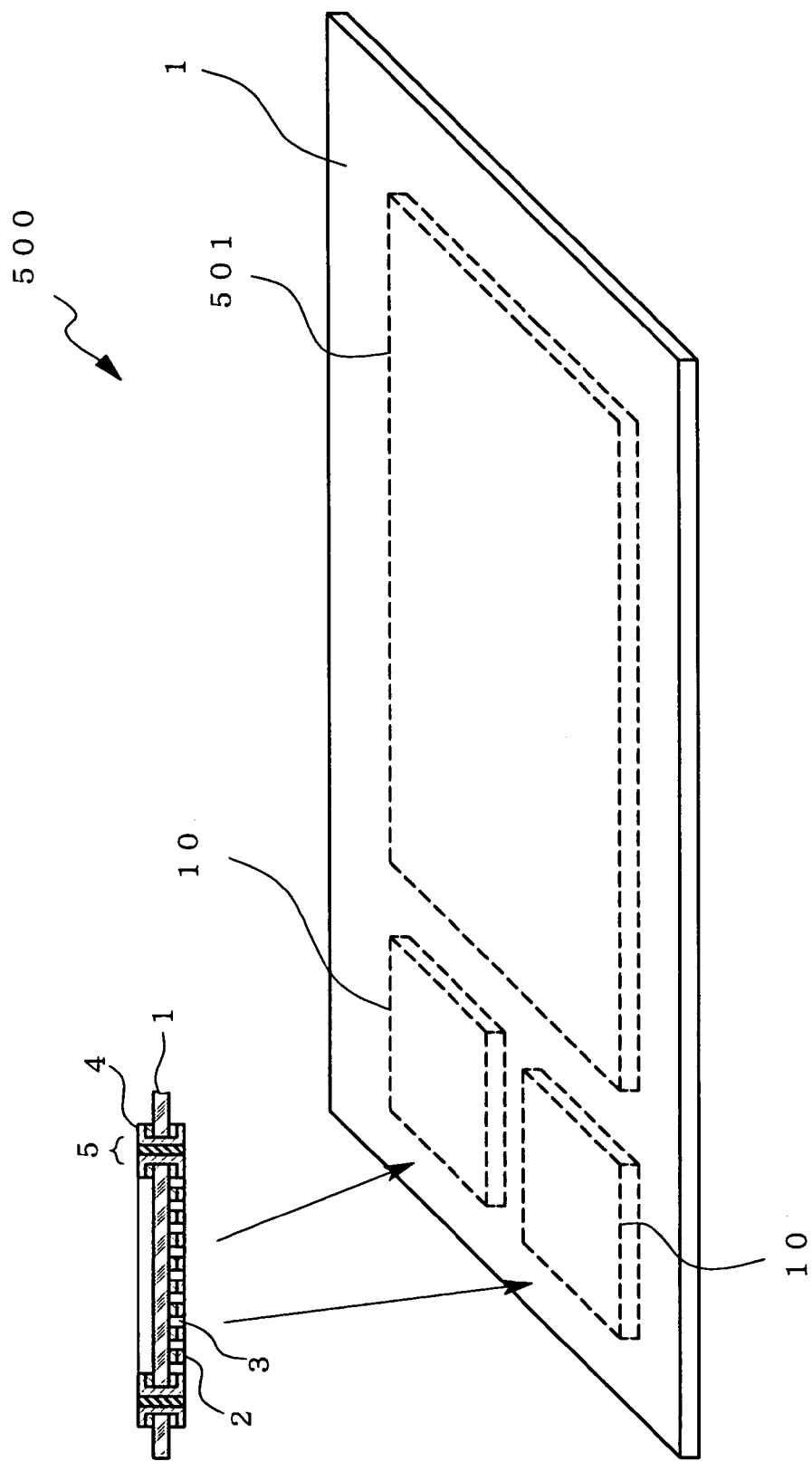
FIG. 13 is a simplified perspective view of one example of a wiring circuit board with the separator for fuel cell of the present invention.

FIG. 13 is a simplified perspective view of one example of a wiring circuit board with a separator for fuel cell of the present invention. In this Figure, the same symbols as in FIGS. 1-3 show the same or corresponding parts. As shown in a wiring circuit board with a separator for fuel cell 500 in this example, the wiring circuit board with a separator for fuel cell of the present invention comprises a circuit 501 and a separator for fuel cell of the present invention 10 formed on a single insulation layer 1, wherein the circuit 501 and the separator 10 are electrically connected. As used herein, the circuit 501 may be a single surface circuit formed on one principal plane of the insulation layer 1 or a both surface circuit formed on both principal planes of the insulation layer 1. The circuit 501 and separator 10 are electrically connected by a circuit layer (not shown) that links a circuit 501 and a conductor terminal 4 and/or conductor pattern 2 of the separator 10. The circuit layer is formed on the principal plane of the insulation layer 1 during the production of circuit 501 and separator 10. In other words, patterning of the conductive layer formed on the principal plane of the insulation layer 1 forms the circuit 501 and the conductor terminal 4 and/or conductor pattern 2 of the separator 10 as well as a circuit layer (circuit pattern) connecting them.

The separator that the wiring circuit board with a separator for fuel cell 500 of this example has is a separator 10 shown in FIGS. 1-3. The wiring circuit board with a separator for fuel cell of the present invention may have the aforementioned separators 10A (FIG. 5), 10B (FIG. 6), 20 (FIG. 8) and the like of other examples.

The wiring circuit board with a separator for fuel cell of the present invention may have a single separator or plural separators. When the wiring circuit board with a separator for fuel cell of the present invention has plural separators, different separators may be electrically connected, or otherwise, or some parts of plural separators may be electrically connected and other separators may not be electrically connected.

<Fuel Cell Built-In Wiring Circuit Board>

Figure 14:
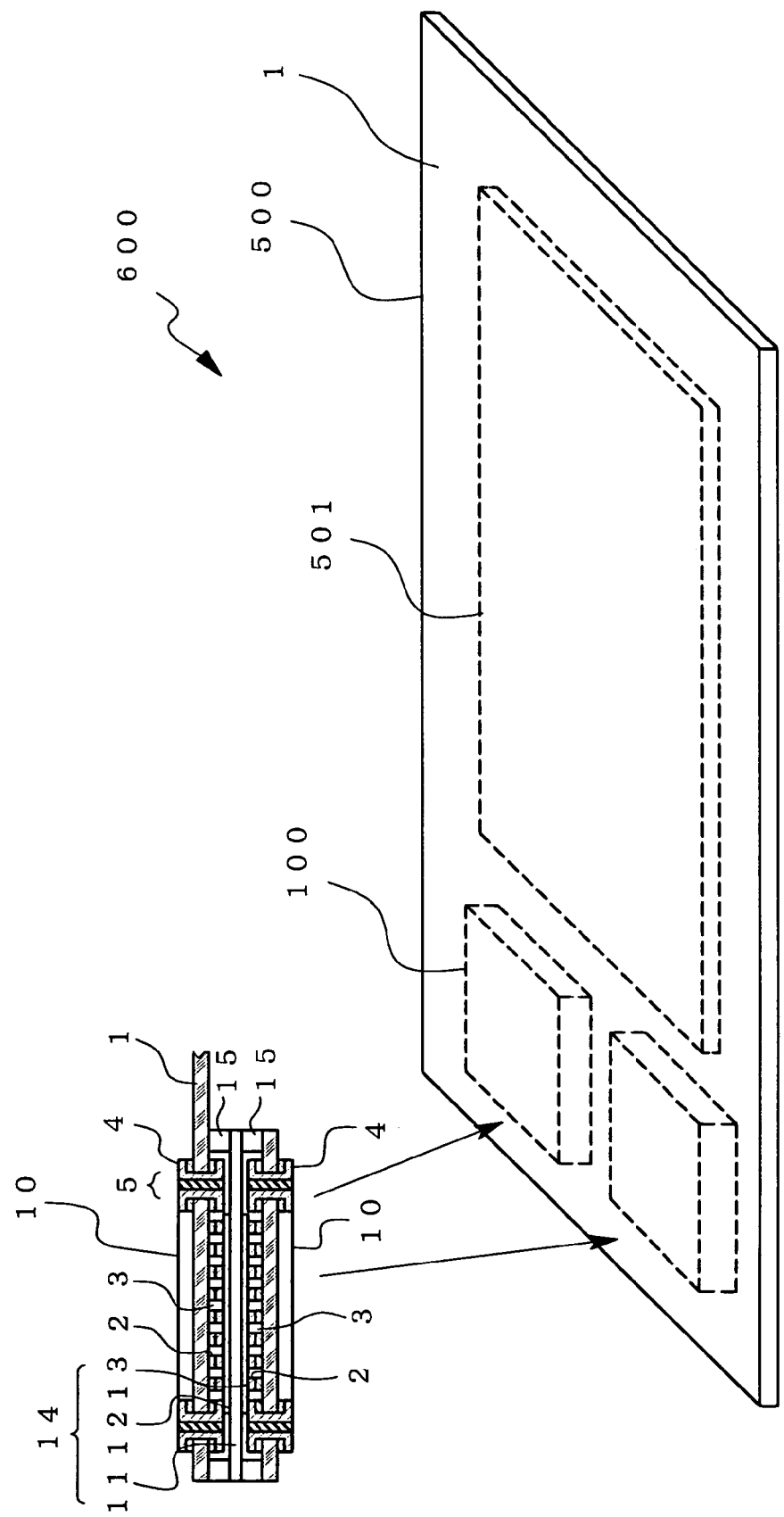
FIG. 14 is a simplified perspective view of a fuel cell built-in wiring circuit board manufactured using the wiring circuit board with the separator for fuel cell shown in FIG. 13.

FIG. 14 is a simplified perspective view of one example of the fuel cell built-in wiring circuit board of the present invention. In this Figure, the same symbols as in FIGS. 1-3, FIG. 4 and FIG. 13 show the same or corresponding parts. As shown in the fuel cell built-in wiring circuit board 600 in this example, in the fuel cell built-in wiring circuit board of the present invention, a separator 10 of a wiring circuit board with a separator for fuel cell 500 of the present invention as shown in FIG. 13 is used to constitute a fuel cell (battery cell) 100. In other words, a fuel cell 100 is combined with the separator 10 to integrate an electric apparatus wiring circuit board and a fuel cell. As used herein, in the wiring circuit board 500, as mentioned above, the circuit 501 and separator 10 are electrically connected by the circuit layer (not shown) formed on the principal plane of the insulation layer 1.

In the fuel cell built-in wiring circuit board of the present invention, the number of the built-in fuel cells may be one or plural. As shown in FIG. 14, plural separators 10 are formed and used as a wiring circuit board with a separator for fuel cell 500, and a fuel cell is combined with each of the separators 10, in other words, a membrane electrode structure 14 is laminated on each of the plural separators 10, a separator 10 prepared separately is laminated thereon, and sealed with an adhesion layer 15 to give a battery cell 100, whereby the built-in fuel cell can have a higher output.

In the fuel cell built-in wiring circuit board of the present invention, the current generated in the fuel cell can be directly led to a circuit (electric/electronic circuit) through a circuit layer formed on the principal plane of the substrate (insulation layer 1). Therefore, complicated circuits (external circuits such as wire and the like) and connectors to connect a fuel cell and a circuit are not necessary. This contributes to the achievement of the requirements of saving space, being thin and the like of a small-sized electronic equipment.

In the foregoing explanation of concrete examples, a fuel cell comprising a polymer electrolyte membrane as an electrolyte membrane of an electric generation part has been used, but the separator of the present invention can be naturally applied to a fuel cell using a membrane electrode assembly having an electrolyte membrane made of molten carbonate, solid oxide (ceramics) or phosphoric acid.

In addition, the separator of the present invention basically comprises an insulation layer made of a plastic film or a composite material for wiring circuit board, and a conductive layer partially formed on both principal planes of the insulation layer, and has characteristics that it can be made thin easily, is particularly lightweight and flexible as compared to conventional separators. Accordingly, as shown in the above-mentioned examples, by using the separator of the present invention as the separator of, from fuel cells, a polymer electrolyte fuel cell (PEFC) recently drawing particular attention because it is flexible, shows higher output and can be made small and lightweight, the vibration resistance of the fuel cell can be further improved, the output can be made still higher and the cell can be made small (thin) and lightweight.

As the polymer electrolyte membrane to be used for a polymer electrolyte fuel cell (PEFC) comprising the separator of the present invention, those known as polymer electrolyte membranes of polymer electrolyte fuel cell (PEFC) can be used without any limitation. Of those, a perfluorocarbon sulfonic acid polymer membrane is particularly preferable because it has high power generation capability and it is not degraded easily. In addition, a partially fluorinated sulfonic acid membrane, a polybenzimidazole membrane, a polyhydroxide fullerene membrane and the like are also preferable.

As an electrode (fuel electrode, oxygen electrode) to be laminated on a polymer electrolyte membrane, those known as fuel electrodes of polymer electrolyte fuel cell (PEFC) can be used as they are. Of those, an embodiment comprising a catalyst reaction layer comprising a carbon powder carrying a platinum metal catalyst as a main component and a diffusion layer comprising a carbon paper to be laminated on this catalyst reaction layer is particularly preferable. As a diffusion layer, moreover, one comprising a sintered membrane obtained by sintering an organic polymer material such as polyimide, polyethylene and the like is also preferable. An electrode wherein a catalyst reaction layer is directly transferred to a polymer electrolyte membrane instead of the above, which is free of a diffusion layer, may be used, whereby the cell can be made thinner.

EXAMPLES

The present invention is explained in detail by referring to examples, which are not to be construed as limitative.

Example 1

(Preparation of Separator)

A laminate plate comprising copper layers each having a thickness of 0.018 mm laminated on both principal planes of a glass epoxy substrate having a thickness of 1.6 mm was prepared and holes having a diameter of 1 mm were formed with a drill at predetermined positions in the principal plane of the laminate plate. Then, copper plating was applied to the entire surfaces of the both surfaces of the laminate plate until the copper layer came to have a thickness of 0.2 mm. As a result, a via hole having a copper layer formed on the inner surface of the holes having a diameter of 1 mm was obtained. The copper layer on the inner surface of the holes having a diameter of 1 mm was linked to the copper layer laminated on the principal plane of the laminate plate. Then, a through-hole remaining inside the copper layer in the via hole was filled with a liquid epoxy resin (EPOX-AH333, Mitsui Chemical) and cured to seal the hole. A dry film resist (SPG-252, Asahi Kasei Corporation) was laminated on the both surfaces of the laminate plate having the via holes formed therein, and exposed to UV light forming a predetermined pattern and the unexposed parts were removed with a dry film dedicated development liquid to complete the resist pattern. Using then resist pattern as a mask, the copper layer was etched with a ferric chloride solution to form a conductor pattern and a terminal on one principal plane and the other principal plane of the glass epoxy substrate. Then, a nickel thin layer (1 μm thick) and a gold thin layer (0.1 μm thick) were formed in this order on the surfaces of the conductor pattern and the terminal thus formed by electric plating. In this way, a separator 10, wherein a conductor pattern 2 comprising a rectangular frame pattern and a pectinate pattern formed on one principal plane of an insulation layer (glass epoxy substrate) 1, a terminal 4 comprising a rectangular frame pattern is formed on the other principal plane of the insulation layer 1, and a conductor pattern 2 and a terminal 4 are electrically connected by a via hole 5, was completed (FIGS. 1-3).

The size of the completed separator was as follows.
insulation layer (glass epoxy substrate): length 30 mm, width 30 mm
proportion of conductor pattern (area proportion) occupying one principal plane of insulation layer (glass epoxy substrate): 76%
full length (length from one flow path opening to the other flow path opening) of gas flow path: 250 mm,
width (width of groove in the direction orthogonal to the axis of flow path) of gas flow path: 0.8-2.4 mm
maximum thickness of separator: 2.0 mm (Preparation of Cell)

A polymer electrolyte membrane (Nafion N112, DuPont) having a thickness of 0.05 mm was sandwiched with a carbon paper (thickness 0.25 mm) having a platinum catalyst formed thereon from the both principal plane sides to give a laminate (generating layer), and the separator prepared as mentioned above was disposed on both surfaces of the laminate, which was sandwiched with a glass epoxy prepreg (MCL-E-67, Hitachi Chemical Co., Ltd.) having a thickness of 0.35 mm and subjected to a vacuum press to give a fuel cell. The weight of the obtained fuel cell as a whole was 80 g and the maximum thickness in the laminate direction was 1.9 mm.

A hydrogen gas and an oxygen gas were fed to the above-mentioned fuel cell, and as a result, 100 mW/cm² of electricity was generated.

Example 2

(Preparation of Separator)

A laminate plate comprising copper layers each having a thickness of 0.018 mm laminated on both principal planes of a glass epoxy substrate having a thickness of 1.6 mm was prepared and holes having a diameter of 1 mm were formed with a drill at predetermined positions in the principal plane of the laminate plate. Then, copper plating was applied to the entire surfaces of the both surfaces of the laminate plate until the copper layer came to have a thickness of 0.03 mm. As a result, a via hole having a copper layer formed on the inner surface of the holes having a diameter of 1 mm was obtained. The copper layer on the inner surface of the holes having a diameter of 1 mm was linked to the copper layer laminated on the principal plane of the laminate plate. Then, a through-hole remaining inside the copper layer in the via hole was filled with a liquid epoxy resin (EPOX-AH333, Mitsui Chemical) and cured to seal the hole. The both principal planes of a glass epoxy substrate comprising a copper layer laminated thereon were subjected to a mechanical processing to form a conductor pattern having a copper layer and a terminal having a copper layer were formed on one principal plane and the other principal plane, respectively, of the glass epoxy substrate. The depth of the groove formed on the glass epoxy substrate then was 0.2 mm. Then, a nickel thin layer (1 μm thick) and a gold thin layer (0.1 μm thick) were formed in this order on the surfaces of the conductor pattern and the terminal formed by electric plating. In this way, a separator 10, wherein a conductor pattern 2 comprising a cyclic pattern having an about square outer shape and a pectinate pattern formed on one principal plane of an insulation layer (glass epoxy substrate) 1, a terminal 4 comprising an about square cyclic pattern was formed on the other principal plane of the insulation layer 1, and a conductor pattern 2 and a terminal 4 were electrically connected by a via hole 5, was completed (FIGS. 1-3).

The size of the completed separator was as follows.
insulation layer (glass epoxy substrate): length 30 mm, width 30 mm
proportion of conductor pattern (area proportion) occupying one principal plane of insulation layer (glass epoxy substrate): 76%
full length (length from one flow path opening to the other flow path opening) of gas flow path: 250 mm,
width (width of groove in the direction orthogonal to the axis of flow path) of gas flow path: 0.8-2.4 mm
maximum thickness of separator: 1.9 mm Example 3

(Preparation of Fuel Electrode and Oxygen Electrode)

A paste comprising a polymer electrolyte membrane ("Nafion", DuPont) solution, a carbon powder and a platinum catalyst (Nafion:carbon powder:platinum catalyst=7:5:3 (weight ratio)) was prepared. This paste was applied onto a carbon paper (thickness 175 μm) with a bar coater and dried at 80° C. for 5 min to form a paste membrane on the carbon paper, which was then subjected to a heat press (130° C., 2 min, 20 kgf/cm²) to smooth the surface of the paste membrane (dry thickness 50 μm). Two sheets of carbon paper having a smooth surface and a paste membrane were formed and used as a fuel electrode and an oxygen electrode as in the following.

(Preparation of Fuel Cell Stack)

A polymer electrolyte membrane ("Nafion N-112", DuPont, thickness 50 μm) was sandwiched between the aforementioned fuel electrode and the oxygen electrode such that a catalyst surface (paste surface) of the electrodes was in contact with the polymer electrolyte membrane and subjected to a heat press (130° C., 2 min, 20 kgf/cm$^2$) to give a membrane electrode assembly. Two of this membrane electrode assembly were produced.

These two membrane electrode assemblies, two one-surface-groove type separators produced in Example 1 and one both surface groove type separator produced following Example 1 were laminated as shown in FIG. 9 and fixed with an epoxy adhesive to complete a fuel cell stack. A stainless steel pipe was used as each pipe to introduce (inject) each of the fuel gas and oxygen gas into a cell, and exhaust them from the cell as well as to pass them between cells.

A fuel gas (hydrogen gas) and an oxygen gas were each injected by 50 cc/min in the fuel cell stack. The voltage between terminals was then measured and found to be 3.18 V. Then the fuel cell stack was connected to an electronic load and set to achieve the voltage between terminals of 1.5 V. As a result, the current became 1.8 A. Thus, the obtained electric power was 2.7 W.

Example 4

(Example of Fuel Cell Assembly Structure)

Figure 12:
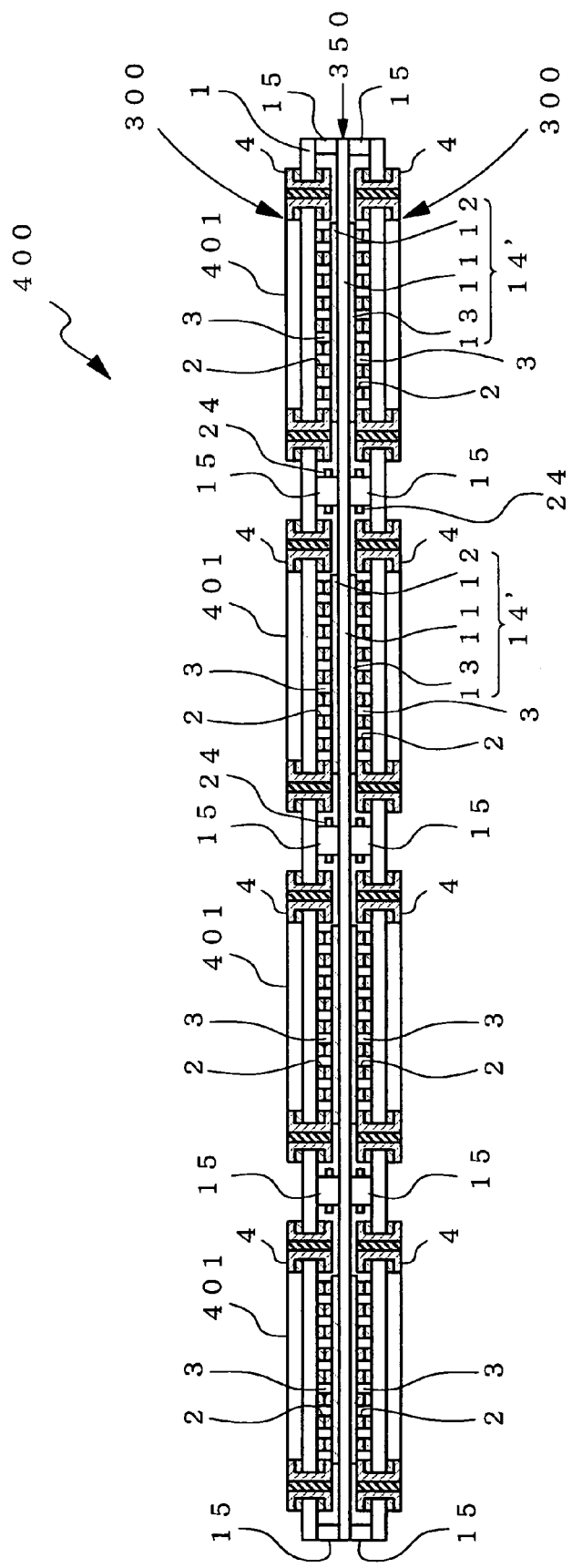
FIG. 12(b) is a sectional view of FIG. 12(a) along the line Y-Y.

Eight sets of membrane electrode assembly as shown in Example 3 were produced. Using similar materials (glass epoxy substrate, copper) as in Example 1, two one-surface-groove type separators assemblies (see FIG. 11) comprising a separator element (conductor pattern and terminal in combination) arranged in 2×4 sequences on one sheet of glass epoxy substrate were produced. The above-mentioned 8 membrane electrode assemblies were sandwiched with these two separator assemblies such that each membrane electrode assembly is in contact with a conductor pattern of the separator assembly and fixed with an epoxy adhesive. A copper foil was attached with an electroconductive adhesive to each terminal of the plural separator elements arranged in 2×4 sequences on the both surfaces of the thus-obtained laminate structure. In this way, a fuel cell assembly structure wherein terminals of plural separator elements are connected in parallel was obtained (see FIG. 12). As each pipe to introduce (inject) each of the fuel gas and oxygen gas into the cell and discharge them from the cell, as well as pass them through the cell, a silicone tube was used.

A fuel gas (hydrogen gas) and an oxygen gas were each injected by 50 cc/min into the fuel cell assembly structure. The voltage between terminals was then measured and found to be 1.05 V. Then the fuel cell assembly structure was connected to an electronic load and set to achieve the voltage between terminals of 0.6 V. As a result, the current became 12 A. Thus, the obtained electric power was 7.2 W.

Example 5

(Fuel Cell Built-In Wiring Circuit Board)

Two membrane electrode assemblies as in Example 3 were produced. Using similar materials (glass epoxy substrate, copper) as in Example 1, one one-surface-groove type separator assembly comprising a separator element (conductor pattern and terminal in combination) arranged in two elements on one sheet of glass epoxy substrate was produced. In addition, using similar materials (glass epoxy substrate, copper) as in Example 1, one one-surface-groove type separator (wiring circuit board with separator) comprising a separator element (conductor pattern and terminal in combination) arranged in two elements on one sheet of glass epoxy substrate, and a voltage booster circuit pattern and a power stabilizer circuit pattern was produced. On this one-surface-groove type separator (wiring circuit board with separator) was simultaneously formed a circuit pattern to electrically connect the terminal of the separator element, and the voltage booster circuit pattern and power stabilizer circuit pattern.

The two membrane electrode assemblies were sandwiched with the above-mentioned one-surface-groove type separator assemblies and wiring circuit board with separator such that each membrane electrode assembly is in contact with conductor patterns of the separator assembly and wiring circuit board with separator, and fixed with an epoxy adhesive. A copper foil was attached with an electroconductive adhesive to each terminal of the separators arranged on the both surfaces of the thus-obtained laminate structure. In this way, a fuel cell built-in wiring circuit board wherein terminals of plural separator elements are connected in parallel was obtained.

A fuel gas (hydrogen gas) and an oxygen gas were each injected by 50 cc/min into the fuel cell built-in wiring circuit board. At this time, the voltage on the input side of a voltage booster circuit was 2.0 V and the voltage on the output side was increased to 5.0 V. Then, PDA (Personal Digital Assistance) operating at about 1.5 W was connected to the output side terminal. As a result, the input voltage decreased to about 1.0 V but the voltage of the voltage booster circuit on the output side was maintained at 5.0 V and the PDA could operate normally.

This application is based on a patent application No. 2003-275019 filed in Japan, the contents of which are hereby incorporated by reference.

What is claimed is:

1. A separator for a fuel cell comprising
an insulation layer,
a groove for a gas flow path formed on one principal plane of said insulation layer by being sectioned by a conductor pattern formed on one principal plane of said insulation layer, wherein the bottom surface of the groove is the principal plane of the insulation layer and a side wall of the groove is a side surface of the conductor pattern,
a conductor terminal formed on the other principal plane of said insulation layer, and
a via hole penetrating through said insulation layer and electrically connecting said conductor terminal and said conductor pattern,
wherein the conductor pattern has a shape of two pectinate patterns facing each other, the conductor terminal is formed in a rectangular ring-like frame pattern, and the two pectinate patterns are disposed inside the rectangular ring-like frame pattern.

2. The separator according to claim 1, further comprising a groove cut in a conductor pattern non-formed region on one principal plane of the insulation layer, wherein the bottom surface of said groove becomes the bottom surface of a groove for a gas flow path.

3. The separator according to claim 1, wherein a surface of the conductor pattern is made of a noble metal.

4. The separator according to claim 2, wherein a surface of the conductor pattern is made of a noble metal.

5. A separator for a fuel cell comprising
an insulation layer,
grooves for gas flow paths formed on both principal planes of said insulation layer by being sectioned by conductor patterns formed on both principal planes of said insulation layer, wherein the bottom surface of the groove is the principal plane of the insulation layer and a side wall of the groove is a side surface of the conductor pattern, and a via hole penetrating through said insulation layer and electrically connecting conductor patterns formed on said both principal planes, wherein the conductor patterns on both main surfaces of the insulation layer each have (a) a rectangular ring-like frame pattern part and (b) a pectinate pattern part comprising two pectinate patterns facing each other, wherein the pectinate pattern part is linked to the rectangular ring-like frame pattern part and defines a groove for a gas flow path inside the rectangular ring-like frame pattern part.

6. The separator according to claim 5, further comprising a groove cut in a conductor pattern non-formed region on at least one of the both principal planes of the insulation layer, wherein the bottom surface of said groove becomes the bottom surface of a groove for a gas flow path.

7. The separator according to claim 5, wherein a surface of the conductor pattern is made of a noble metal.

8. The separator according to claim 6, wherein a surface of the conductor pattern is made of a noble metal.

9. A fuel cell comprising the separator according to any of claims 1-8.

10. A separator assembly for a fuel cell, which comprises plural separators according to claim 1 or 2 on a single insulation layer.

11. A fuel cell assembly structure, wherein an electricity generating element assembly comprising plural electricity generation membrane electrode composite structures formed on a single electrolyte membrane is supported by being sandwiched between the separator assemblies of claim 10 from both surfaces of top and bottom thereof.

12. A fuel cell stack comprising two or more electricity generation cells stacked one upon another, wherein the separator according to claim 5 or 6 is formed between two adjacent electricity generation cells, and a second separator comprising either (a) an insulation layer, a groove for a gas flow oath formed on one principal plane of said insulation layer by being sectioned by a conductor pattern formed on one principal plane of said insulation layer, wherein the bottom surface of the groove is the principal plane of the insulation layer and a side wall of the groove is a side surface of the conductor pattern, a conductor terminal formed on the other principal plane of said insulation layer, and a via hole penetrating through said insulation layer and electrically connecting said conductor terminal and said conductor pattern, wherein the conductor pattern has a shape of two pectinate patterns facing each other, the conductor terminal is formed in a rectangular ring-like frame pattern, and the two pectinate patterns are disposed inside the rectangular ring-like frame pattern or (b) an insulation layer, a groove for a gas flow path formed on one principal plane of said insulation layer by being sectioned by a conductor pattern formed on one principal plane of said insulation layer, wherein the bottom surface of the groove is the principal plane of the insulation layer and a side wall of the groove is a side surface of the conductor pattern, a conductor terminal formed on the other principal plane of said insulation layer, a via hole penetrating through said insulation layer and electrically connecting said conductor terminal and said conductor pattern, and a groove cut in a conductor pattern non-formed region on one principal plane of the insulation layer, wherein the bottom surface of said groove becomes the bottom surface of a groove for a gas flow path, wherein the conductor pattern has a shape of two pectinate patterns facing each other, the conductor terminal is formed in a rectangular ring-like frame pattern, and the two pectinate patterns are disposed inside the rectangular ring-like frame pattern is formed on the outermost parts of both sides in the stacking direction of the electricity generation cell.

13. A wiring circuit board with a separator for a fuel cell, wherein a circuit and the separator according to any of claims 1-8 are formed on a single insulation layer and said circuit and the separator are electrically connected.

14. A fuel cell built-in wiring circuit board, wherein the fuel cell comprises the wiring circuit board with a separator according to claim 13.

* * * * *

UNITED STATES PATENT AND TRADEMARK OFFICE
CERTIFICATE OF CORRECTION

| | | |
|---|---|---|
| PATENT NO. | : 7,632,599 B2 | Page 1 of 1 |
| APPLICATION NO. | : 10/891565 | |
| DATED | : December 15, 2009 | |
| INVENTOR(S) | : Ouchi et al. | |

It is certified that error appears in the above-identified patent and that said Letters Patent is hereby corrected as shown below:

ON THE TITLE PAGE:

(75) Inventors: Kazuo Ouchi, Ibaraki (JP); Hitoshi Ishizaka, Ibaraki (JP)

should read

"(75) Inventors: Kazuo Ouchi, Ibaraki-shi (JP); Hitoshi Ishizaka, Ibaraki-shi (JP)"

Claim 12 at column 19, line 44, "flow oath" should read "flow path"

Signed and Sealed this

Twentieth Day of April, 2010

David J. Kappos
*Director of the United States Patent and Trademark Office*